US010771881B2

(12) United States Patent
Turner et al.

(10) Patent No.: US 10,771,881 B2
(45) Date of Patent: Sep. 8, 2020

(54) EARPIECE WITH AUDIO 3D MENU

(71) Applicant: BRAGI GmbH, Munich (DE)

(72) Inventors: Jake Berry Turner, Munich (DE); Alex Pohl, Munich (DE); Ye Li, Munich (DE); David K Dohmen, Munich (DE); Gwenael Kosider, Munich (DE)

(73) Assignee: BRAGI GmbH, Munich (DE)

( * ) Notice: Subject to any disclaimer, the term of this patent is extended or adjusted under 35 U.S.C. 154(b) by 58 days.

(21) Appl. No.: 15/903,145

(22) Filed: Feb. 23, 2018

(65) Prior Publication Data
US 2018/0249239 A1 Aug. 30, 2018

Related U.S. Application Data

(60) Provisional application No. 62/464,337, filed on Feb. 27, 2017.

(51) Int. Cl.
*H04R 1/10* (2006.01)
*H04R 5/033* (2006.01)
(Continued)

(52) U.S. Cl.
CPC ........... *H04R 1/1041* (2013.01); *G06F 3/012* (2013.01); *G06F 3/0346* (2013.01);
(Continued)

(58) Field of Classification Search
CPC .... H04R 1/1041; H04R 1/1016; H04R 5/033; H04R 2420/07; G06F 3/012; H04S 7/304; H04S 2400/11
See application file for complete search history.

(56) References Cited

U.S. PATENT DOCUMENTS 2,325,590 A    8/1943   Carlisle et al.
2,430,229 A   11/1947   Kelsey
(Continued)

FOREIGN PATENT DOCUMENTS

CN    204244472 U    4/2015
CN    104683519 A    6/2015
(Continued)

OTHER PUBLICATIONS

Akkermans, "Acoustic Ear Recognition for Person Identification", Automatic Identification Advanced Technologies, 2005 pp. 219-223.
(Continued)

*Primary Examiner* — Sonia L Gay
(74) *Attorney, Agent, or Firm* — Goodhue, Coleman & Owens, P.C.

(57) ABSTRACT

An earpiece includes an earpiece housing, an intelligent control system disposed within the earpiece housing, a speaker operatively connected to the intelligent control system, a microphone operatively connected to the intelligent control system, and at least one sensor operatively connected to the intelligent control system for providing sensor data. The intelligent control system of the earpiece is configured to interface with a user of the earpiece by determining at least one of attention or intention of the user using the sensor data without receiving manual input at the earpiece and without receiving voice input from the user. The earpiece may be further configured to present an audio menu and use the attention or intention of the user to select one or more items from the audio menu.

18 Claims, 4 Drawing Sheets

(51) Int. Cl.
*G06F 3/01* (2006.01)
*G06F 3/0346* (2013.01)
*H04S 7/00* (2006.01)

(52) U.S. Cl.
CPC ............ *H04R 1/1016* (2013.01); *H04R 5/033* (2013.01); *H04R 2420/07* (2013.01); *H04S 7/304* (2013.01); *H04S 2400/11* (2013.01)

(56) References Cited

U.S. PATENT DOCUMENTS

| | | |
|---|---|---|
| 3,047,089 A | 7/1962 | Zwislocki |
| D208,784 S | 10/1967 | Sanzone |
| 3,586,794 A | 6/1971 | Michaelis |
| 3,696,377 A | 10/1972 | Wall |
| 3,934,100 A | 1/1976 | Harada |
| 3,983,336 A | 9/1976 | Malek et al. |
| 4,069,400 A | 1/1978 | Johanson et al. |
| 4,150,262 A | 4/1979 | Ono |
| 4,334,315 A | 6/1982 | Ono et al. |
| D266,271 S | 9/1982 | Johanson et al. |
| 4,375,016 A | 2/1983 | Harada |
| 4,588,867 A | 5/1986 | Konomi |
| 4,617,429 A | 10/1986 | Bellafiore |
| 4,654,883 A | 3/1987 | Iwata |
| 4,682,180 A | 7/1987 | Gans |
| 4,791,673 A | 12/1988 | Schreiber |
| 4,852,177 A | 7/1989 | Ambrose |
| 4,865,044 A | 9/1989 | Wallace et al. |
| 4,984,277 A | 1/1991 | Bisgaard et al. |
| 5,008,943 A | 4/1991 | Arndt et al. |
| 5,185,802 A | 2/1993 | Stanton |
| 5,191,602 A | 3/1993 | Regen et al. |
| 5,201,007 A | 4/1993 | Ward et al. |
| 5,201,008 A | 4/1993 | Arndt et al. |
| D340,286 S | 10/1993 | Seo |
| 5,280,524 A | 1/1994 | Norris |
| 5,295,193 A | 3/1994 | Ono |
| 5,298,692 A | 3/1994 | Ikeda et al. |
| 5,343,532 A | 8/1994 | Shugart |
| 5,347,584 A | 9/1994 | Narisawa |
| 5,363,444 A | 11/1994 | Norris |
| 5,444,786 A | 8/1995 | Raviv |
| D367,113 S | 2/1996 | Weeks |
| 5,497,339 A | 3/1996 | Bernard |
| 5,606,621 A | 2/1997 | Reiter et al. |
| 5,613,222 A | 3/1997 | Guenther |
| 5,654,530 A | 8/1997 | Sauer et al. |
| 5,692,059 A | 11/1997 | Kruger |
| 5,721,783 A | 2/1998 | Anderson |
| 5,748,743 A | 5/1998 | Weeks |
| 5,749,072 A | 5/1998 | Mazurkiewicz et al. |
| 5,771,438 A | 6/1998 | Palermo et al. |
| D397,796 S | 9/1998 | Yabe et al. |
| 5,802,167 A | 9/1998 | Hong |
| 5,844,996 A | 12/1998 | Enzmann et al. |
| D410,008 S | 5/1999 | Almqvist |
| 5,929,774 A | 7/1999 | Charlton |
| 5,933,506 A | 8/1999 | Aoki et al. |
| 5,949,896 A | 9/1999 | Nageno et al. |
| 5,987,146 A | 11/1999 | Pluvinage et al. |
| 6,021,207 A | 2/2000 | Puthuff et al. |
| 6,054,989 A | 4/2000 | Robertson et al. |
| 6,081,724 A | 6/2000 | Wilson |
| 6,084,526 A | 7/2000 | Blotky et al. |
| 6,094,492 A | 7/2000 | Boesen |
| 6,111,569 A | 8/2000 | Brusky et al. |
| 6,112,103 A | 8/2000 | Puthuff |
| 6,157,727 A | 12/2000 | Rueda |
| 6,167,039 A | 12/2000 | Karlsson et al. |
| 6,181,801 B1 | 1/2001 | Puthuff et al. |
| 6,185,152 B1 | 2/2001 | Shen |
| 6,208,372 B1 | 3/2001 | Barraclough |
| 6,230,029 B1 | 5/2001 | Hahn et al. |
| 6,275,789 B1 | 8/2001 | Moser et al. |
| 6,339,754 B1 | 1/2002 | Flanagan et al. |
| D455,835 S | 4/2002 | Anderson et al. |
| 6,408,081 B1 | 6/2002 | Boesen |
| 6,424,820 B1 | 7/2002 | Burdick et al. |
| D464,039 S | 10/2002 | Boesen |
| 6,470,893 B1 | 10/2002 | Boesen |
| D468,299 S | 1/2003 | Boesen |
| D468,300 S | 1/2003 | Boesen |
| 6,542,721 B2 | 4/2003 | Boesen |
| 6,560,468 B1 | 5/2003 | Boesen |
| 6,563,301 B2 | 5/2003 | Gventer |
| 6,654,721 B2 | 11/2003 | Handelman |
| 6,664,713 B2 | 12/2003 | Boesen |
| 6,690,807 B1 | 2/2004 | Meyer |
| 6,694,180 B1 | 2/2004 | Boesen |
| 6,718,043 B1 | 4/2004 | Boesen |
| 6,738,485 B1 | 5/2004 | Boesen |
| 6,748,095 B1 | 6/2004 | Goss |
| 6,754,358 B1 | 6/2004 | Boesen et al. |
| 6,784,873 B1 | 8/2004 | Boesen et al. |
| 6,823,195 B1 | 11/2004 | Boesen |
| 6,852,084 B1 | 2/2005 | Boesen |
| 6,879,698 B2 | 4/2005 | Boesen |
| 6,892,082 B2 | 5/2005 | Boesen |
| 6,920,229 B2 | 7/2005 | Boesen |
| 6,952,483 B2 | 10/2005 | Boesen et al. |
| 6,987,986 B2 | 1/2006 | Boesen |
| 7,010,137 B1 | 3/2006 | Leedom et al. |
| 7,113,611 B2 | 9/2006 | Leedom et al. |
| D532,520 S | 11/2006 | Kampmeier et al. |
| 7,136,282 B1 | 11/2006 | Rebeske |
| 7,203,331 B2 | 4/2007 | Boesen |
| 7,209,569 B2 | 4/2007 | Boesen |
| 7,215,790 B2 | 5/2007 | Boesen et al. |
| D549,222 S | 8/2007 | Huang |
| D554,756 S | 11/2007 | Sjursen et al. |
| 7,403,629 B1 | 7/2008 | Aceti et al. |
| D579,006 S | 10/2008 | Kim et al. |
| 7,463,902 B2 | 12/2008 | Boesen |
| 7,508,411 B2 | 3/2009 | Boesen |
| 7,532,901 B1 | 5/2009 | LaFranchise et al. |
| D601,134 S | 9/2009 | Elabidi et al. |
| 7,825,626 B2 | 11/2010 | Kozisek |
| 7,859,469 B1 | 12/2010 | Rosener et al. |
| 7,965,855 B1 | 6/2011 | Ham |
| 7,979,035 B2 | 7/2011 | Griffin et al. |
| 7,983,628 B2 | 7/2011 | Boesen |
| D647,491 S | 10/2011 | Chen et al. |
| 8,095,188 B2 | 1/2012 | Shi |
| 8,108,143 B1 | 1/2012 | Tester |
| 8,140,357 B1 | 3/2012 | Boesen |
| D666,581 S | 9/2012 | Perez |
| 8,300,864 B2 | 10/2012 | Müllenborn et al. |
| 8,406,448 B2 | 3/2013 | Lin |
| 8,430,817 B1 | 4/2013 | Al-Ali et al. |
| 8,436,780 B2 | 5/2013 | Schantz et al. |
| D687,021 S | 7/2013 | Yuen |
| 8,679,012 B1 | 3/2014 | Kayyali |
| 8,719,877 B2 | 5/2014 | VonDoenhoff et al. |
| 8,774,434 B2 | 7/2014 | Zhao et al. |
| 8,831,266 B1 | 9/2014 | Huang |
| 8,891,800 B1 | 11/2014 | Shaffer |
| 8,994,498 B2 | 3/2015 | Agrafioti et al. |
| D728,107 S | 4/2015 | Martin et al. |
| 9,013,145 B2 | 4/2015 | Castillo et al. |
| 9,026,914 B1 * | 5/2015 | Kauffmann ............ G06F 3/167 715/727 |
| 9,037,125 B1 | 5/2015 | Kadous |
| D733,103 S | 6/2015 | Jeong et al. |
| 9,081,944 B2 | 7/2015 | Camacho et al. |
| 9,461,403 B2 | 10/2016 | Gao et al. |
| 9,510,159 B1 | 11/2016 | Cuddihy et al. |
| D773,439 S | 12/2016 | Walker |
| D775,158 S | 12/2016 | Dong et al. |
| D777,710 S | 1/2017 | Palmborg et al. |
| 9,544,689 B2 | 1/2017 | Fisher et al. |
| D788,079 S | 5/2017 | Son et al. |
| 9,711,062 B2 | 7/2017 | Ellis et al. |
| 9,729,979 B2 | 8/2017 | Özden |

(56) References Cited

U.S. PATENT DOCUMENTS

| | | |
|---|---|---|
| 9,767,709 B2 | 9/2017 | Ellis |
| 9,769,585 B1* | 9/2017 | Hills .................. H04S 5/00 |
| 9,848,257 B2 | 12/2017 | Ambrose et al. |
| 2001/0005197 A1 | 6/2001 | Mishra et al. |
| 2001/0027121 A1 | 10/2001 | Boesen |
| 2001/0043707 A1 | 11/2001 | Leedom |
| 2001/0056350 A1 | 12/2001 | Calderone et al. |
| 2002/0002413 A1 | 1/2002 | Tokue |
| 2002/0007510 A1 | 1/2002 | Mann |
| 2002/0010590 A1 | 1/2002 | Lee |
| 2002/0030637 A1 | 3/2002 | Mann |
| 2002/0046035 A1 | 4/2002 | Kitahara et al. |
| 2002/0057810 A1 | 5/2002 | Boesen |
| 2002/0076073 A1 | 6/2002 | Taenzer et al. |
| 2002/0118852 A1 | 8/2002 | Boesen |
| 2003/0002705 A1 | 1/2003 | Boesen |
| 2003/0065504 A1 | 4/2003 | Kraemer et al. |
| 2003/0100331 A1 | 5/2003 | Dress et al. |
| 2003/0104806 A1 | 6/2003 | Ruef et al. |
| 2003/0115068 A1 | 6/2003 | Boesen |
| 2003/0125096 A1 | 7/2003 | Boesen |
| 2003/0218064 A1 | 11/2003 | Conner et al. |
| 2004/0070564 A1 | 4/2004 | Dawson et al. |
| 2004/0102931 A1 | 5/2004 | Ellis et al. |
| 2004/0160511 A1 | 8/2004 | Boesen |
| 2005/0017842 A1 | 1/2005 | Dematteo |
| 2005/0043056 A1 | 2/2005 | Boesen |
| 2005/0094839 A1 | 5/2005 | Gwee |
| 2005/0125320 A1 | 6/2005 | Boesen |
| 2005/0148883 A1 | 7/2005 | Boesen |
| 2005/0165663 A1 | 7/2005 | Razumov |
| 2005/0196009 A1 | 9/2005 | Boesen |
| 2005/0197063 A1 | 9/2005 | White |
| 2005/0212911 A1 | 9/2005 | Marvit et al. |
| 2005/0251455 A1 | 11/2005 | Boesen |
| 2005/0266876 A1 | 12/2005 | Boesen |
| 2006/0029246 A1 | 2/2006 | Boesen |
| 2006/0073787 A1 | 4/2006 | Lair et al. |
| 2006/0074671 A1 | 4/2006 | Farmaner et al. |
| 2006/0074808 A1 | 4/2006 | Boesen |
| 2006/0166715 A1 | 7/2006 | Engelen et al. |
| 2006/0166716 A1 | 7/2006 | Seshadri et al. |
| 2006/0220915 A1 | 10/2006 | Bauer |
| 2006/0258412 A1 | 11/2006 | Liu |
| 2007/0102009 A1 | 5/2007 | Wong et al. |
| 2007/0239225 A1 | 10/2007 | Saringer |
| 2007/0269785 A1 | 11/2007 | Yamanoi |
| 2008/0076972 A1 | 3/2008 | Dorogusker et al. |
| 2008/0090622 A1 | 4/2008 | Kim et al. |
| 2008/0102424 A1 | 5/2008 | Holljes |
| 2008/0146890 A1 | 6/2008 | LeBoeuf et al. |
| 2008/0187163 A1 | 8/2008 | Goldstein et al. |
| 2008/0215239 A1 | 9/2008 | Lee |
| 2008/0253583 A1 | 10/2008 | Goldstein et al. |
| 2008/0254780 A1 | 10/2008 | Kuhl et al. |
| 2008/0255430 A1 | 10/2008 | Alexandersson et al. |
| 2008/0298606 A1 | 12/2008 | Johnson et al. |
| 2009/0003620 A1 | 1/2009 | McKillop et al. |
| 2009/0008275 A1 | 1/2009 | Ferrari et al. |
| 2009/0017881 A1 | 1/2009 | Madrigal |
| 2009/0073070 A1 | 3/2009 | Rofougaran |
| 2009/0097689 A1 | 4/2009 | Prest et al. |
| 2009/0105548 A1 | 4/2009 | Bart |
| 2009/0154739 A1 | 6/2009 | Zellner |
| 2009/0191920 A1 | 7/2009 | Regen et al. |
| 2009/0226017 A1 | 9/2009 | Abolfathi et al. |
| 2009/0245559 A1 | 10/2009 | Boltyenkov et al. |
| 2009/0261114 A1 | 10/2009 | McGuire et al. |
| 2009/0296968 A1 | 12/2009 | Wu et al. |
| 2009/0303073 A1 | 12/2009 | Gilling et al. |
| 2009/0304210 A1 | 12/2009 | Weisman |
| 2010/0033313 A1 | 2/2010 | Keady et al. |
| 2010/0100004 A1* | 4/2010 | van Someren ....... A61B 5/0008 600/549 |
| 2010/0166206 A1 | 7/2010 | Macours |
| 2010/0203831 A1 | 8/2010 | Muth |
| 2010/0210212 A1 | 8/2010 | Sato |
| 2010/0246847 A1* | 9/2010 | Johnson, Jr. ......... H04R 1/1041 381/74 |
| 2010/0290636 A1 | 11/2010 | Mao et al. |
| 2010/0320961 A1 | 12/2010 | Castillo et al. |
| 2011/0018731 A1 | 1/2011 | Linsky et al. |
| 2011/0103609 A1 | 5/2011 | Pelland et al. |
| 2011/0137141 A1 | 6/2011 | Razoumov et al. |
| 2011/0140844 A1 | 6/2011 | McGuire et al. |
| 2011/0200213 A1* | 8/2011 | Knox .................. H04R 25/505 381/314 |
| 2011/0239497 A1 | 10/2011 | McGuire et al. |
| 2011/0286615 A1 | 11/2011 | Olodort et al. |
| 2011/0293105 A1 | 12/2011 | Arie et al. |
| 2012/0057740 A1 | 3/2012 | Rosal |
| 2012/0155670 A1 | 6/2012 | Rutschman |
| 2012/0163626 A1 | 6/2012 | Booij et al. |
| 2012/0197737 A1 | 8/2012 | LeBoeuf et al. |
| 2012/0235883 A1 | 9/2012 | Border et al. |
| 2012/0309453 A1 | 12/2012 | Maguire |
| 2013/0106454 A1 | 5/2013 | Liu et al. |
| 2013/0154826 A1 | 6/2013 | Ratajczyk |
| 2013/0178967 A1 | 7/2013 | Mentz |
| 2013/0204617 A1 | 8/2013 | Kuo et al. |
| 2013/0293494 A1 | 11/2013 | Reshef |
| 2013/0316642 A1 | 11/2013 | Newham |
| 2013/0346168 A1 | 12/2013 | Zhou et al. |
| 2014/0004912 A1 | 1/2014 | Rajakarunanayake |
| 2014/0014697 A1 | 1/2014 | Schmierer et al. |
| 2014/0020089 A1 | 1/2014 | Perini, II |
| 2014/0072136 A1 | 3/2014 | Tenenbaum et al. |
| 2014/0072146 A1 | 3/2014 | Itkin et al. |
| 2014/0073429 A1 | 3/2014 | Meneses et al. |
| 2014/0079257 A1 | 3/2014 | Ruwe et al. |
| 2014/0106677 A1 | 4/2014 | Altman |
| 2014/0122116 A1 | 5/2014 | Smythe |
| 2014/0146973 A1 | 5/2014 | Liu et al. |
| 2014/0153768 A1 | 6/2014 | Hagen et al. |
| 2014/0163771 A1 | 6/2014 | Demeniuk |
| 2014/0185828 A1 | 7/2014 | Helbling |
| 2014/0219467 A1 | 8/2014 | Kurtz |
| 2014/0222462 A1 | 8/2014 | Shakil et al. |
| 2014/0235169 A1 | 8/2014 | Parkinson et al. |
| 2014/0270227 A1 | 9/2014 | Swanson |
| 2014/0270271 A1 | 9/2014 | Dehe et al. |
| 2014/0276227 A1 | 9/2014 | Pérez |
| 2014/0310595 A1 | 10/2014 | Acharya et al. |
| 2014/0321682 A1 | 10/2014 | Kofod-Hansen et al. |
| 2014/0335908 A1 | 11/2014 | Krisch et al. |
| 2014/0348367 A1 | 11/2014 | Vavrus et al. |
| 2014/0359450 A1* | 12/2014 | Lehtiniemi ........... G06F 3/0488 715/727 |
| 2015/0028996 A1 | 1/2015 | Agrafioti et al. |
| 2015/0035643 A1 | 2/2015 | Kursun |
| 2015/0036835 A1 | 2/2015 | Chen |
| 2015/0056584 A1 | 2/2015 | Boulware et al. |
| 2015/0110587 A1 | 4/2015 | Hori |
| 2015/0148989 A1 | 5/2015 | Cooper et al. |
| 2015/0181356 A1 | 6/2015 | Krystek et al. |
| 2015/0230022 A1 | 8/2015 | Sakai et al. |
| 2015/0245127 A1 | 8/2015 | Shaffer |
| 2015/0256949 A1 | 9/2015 | Vanpoucke et al. |
| 2015/0264472 A1 | 9/2015 | Aase |
| 2015/0264501 A1 | 9/2015 | Hu et al. |
| 2015/0317565 A1 | 11/2015 | Li et al. |
| 2015/0358751 A1 | 12/2015 | Deng et al. |
| 2015/0359436 A1 | 12/2015 | Shim et al. |
| 2015/0364058 A1 | 12/2015 | Lagree et al. |
| 2015/0373467 A1 | 12/2015 | Gelter |
| 2015/0373474 A1 | 12/2015 | Kraft et al. |
| 2016/0033280 A1 | 2/2016 | Moore et al. |
| 2016/0034249 A1 | 2/2016 | Lee et al. |
| 2016/0071526 A1 | 3/2016 | Wingate et al. |
| 2016/0072558 A1 | 3/2016 | Hirsch et al. |
| 2016/0073189 A1 | 3/2016 | Lindén et al. |
| 2016/0100262 A1 | 4/2016 | Inagaki |
| 2016/0119737 A1 | 4/2016 | Mehnert et al. |
| 2016/0124707 A1 | 5/2016 | Ermilov et al. |

(56) References Cited

U.S. PATENT DOCUMENTS

| | | |
|---|---|---|
| 2016/0125892 A1 | 5/2016 | Bowen et al. |
| 2016/0140870 A1 | 5/2016 | Connor |
| 2016/0142818 A1 | 5/2016 | Park |
| 2016/0150339 A1* | 5/2016 | Choueiri .............. H04S 1/005 381/309 |
| 2016/0162259 A1 | 6/2016 | Zhao et al. |
| 2016/0209691 A1 | 7/2016 | Yang et al. |
| 2016/0253994 A1 | 9/2016 | Panchapagesan et al. |
| 2016/0324478 A1 | 11/2016 | Goldstein |
| 2016/0353196 A1 | 12/2016 | Baker et al. |
| 2016/0360350 A1 | 12/2016 | Watson et al. |
| 2017/0021257 A1 | 1/2017 | Gilbert et al. |
| 2017/0046503 A1 | 2/2017 | Cho et al. |
| 2017/0059152 A1 | 3/2017 | Hirsch et al. |
| 2017/0060262 A1 | 3/2017 | Hviid et al. |
| 2017/0060269 A1 | 3/2017 | Förstner et al. |
| 2017/0061751 A1 | 3/2017 | Loermann et al. |
| 2017/0061817 A1 | 3/2017 | Mettler May |
| 2017/0062913 A1 | 3/2017 | Hirsch et al. |
| 2017/0064426 A1 | 3/2017 | Hviid |
| 2017/0064428 A1 | 3/2017 | Hirsch |
| 2017/0064432 A1 | 3/2017 | Hviid et al. |
| 2017/0064437 A1 | 3/2017 | Hviid et al. |
| 2017/0078780 A1 | 3/2017 | Qian et al. |
| 2017/0078785 A1 | 3/2017 | Qian et al. |
| 2017/0100277 A1 | 4/2017 | Ke |
| 2017/0108918 A1 | 4/2017 | Boesen |
| 2017/0109131 A1 | 4/2017 | Boesen |
| 2017/0110124 A1 | 4/2017 | Boesen et al. |
| 2017/0110899 A1 | 4/2017 | Boesen |
| 2017/0111723 A1 | 4/2017 | Boesen |
| 2017/0111725 A1 | 4/2017 | Boesen et al. |
| 2017/0111726 A1 | 4/2017 | Martin et al. |
| 2017/0111740 A1 | 4/2017 | Hviid et al. |
| 2017/0127168 A1 | 5/2017 | Briggs et al. |
| 2017/0131094 A1 | 5/2017 | Kulik |
| 2017/0142511 A1 | 5/2017 | Dennis |
| 2017/0146801 A1 | 5/2017 | Stempora |
| 2017/0150920 A1 | 6/2017 | Chang et al. |
| 2017/0151085 A1 | 6/2017 | Chang et al. |
| 2017/0151447 A1 | 6/2017 | Boesen |
| 2017/0151668 A1 | 6/2017 | Boesen |
| 2017/0151918 A1 | 6/2017 | Boesen |
| 2017/0151930 A1 | 6/2017 | Boesen |
| 2017/0151957 A1 | 6/2017 | Boesen |
| 2017/0151959 A1 | 6/2017 | Boesen |
| 2017/0153114 A1 | 6/2017 | Boesen |
| 2017/0153636 A1 | 6/2017 | Boesen |
| 2017/0154532 A1 | 6/2017 | Boesen |
| 2017/0155985 A1 | 6/2017 | Boesen |
| 2017/0155992 A1 | 6/2017 | Perianu et al. |
| 2017/0155993 A1 | 6/2017 | Boesen |
| 2017/0155997 A1 | 6/2017 | Boesen |
| 2017/0155998 A1 | 6/2017 | Boesen |
| 2017/0156000 A1 | 6/2017 | Boesen |
| 2017/0164890 A1 | 6/2017 | Leip et al. |
| 2017/0178631 A1 | 6/2017 | Boesen |
| 2017/0180842 A1 | 6/2017 | Boesen |
| 2017/0180843 A1 | 6/2017 | Perianu et al. |
| 2017/0180897 A1 | 6/2017 | Perianu |
| 2017/0188127 A1 | 6/2017 | Perianu et al. |
| 2017/0188132 A1 | 6/2017 | Hirsch et al. |
| 2017/0193978 A1 | 7/2017 | Goldman |
| 2017/0195829 A1 | 7/2017 | Belverato et al. |
| 2017/0208393 A1 | 7/2017 | Boesen |
| 2017/0214987 A1 | 7/2017 | Boesen |
| 2017/0215016 A1 | 7/2017 | Dohmen et al. |
| 2017/0230752 A1 | 8/2017 | Dohmen et al. |
| 2017/0251933 A1 | 9/2017 | Braun et al. |
| 2017/0257698 A1 | 9/2017 | Boesen et al. |
| 2017/0258329 A1 | 9/2017 | Marsh |
| 2017/0263236 A1 | 9/2017 | Boesen et al. |
| 2017/0263376 A1 | 9/2017 | Verschueren et al. |
| 2017/0266494 A1 | 9/2017 | Crankson et al. |
| 2017/0273622 A1 | 9/2017 | Boesen |
| 2017/0280257 A1 | 9/2017 | Gordon et al. |
| 2017/0301337 A1 | 10/2017 | Golani et al. |
| 2017/0347177 A1* | 11/2017 | Masaki ............... H04R 1/1016 |
| 2017/0361213 A1 | 12/2017 | Goslin et al. |
| 2017/0366233 A1 | 12/2017 | Hviid et al. |
| 2018/0007994 A1 | 1/2018 | Boesen et al. |
| 2018/0008194 A1 | 1/2018 | Boesen |
| 2018/0008198 A1 | 1/2018 | Kingscott |
| 2018/0009447 A1 | 1/2018 | Boesen et al. |
| 2018/0011006 A1 | 1/2018 | Kingscott |
| 2018/0011682 A1 | 1/2018 | Milevski et al. |
| 2018/0011994 A1 | 1/2018 | Boesen |
| 2018/0012228 A1 | 1/2018 | Milevski et al. |
| 2018/0013195 A1 | 1/2018 | Hviid et al. |
| 2018/0014102 A1 | 1/2018 | Hirsch et al. |
| 2018/0014103 A1 | 1/2018 | Martin et al. |
| 2018/0014104 A1 | 1/2018 | Boesen et al. |
| 2018/0014107 A1 | 1/2018 | Razouane et al. |
| 2018/0014108 A1 | 1/2018 | Dragicevic et al. |
| 2018/0014109 A1 | 1/2018 | Boesen |
| 2018/0014113 A1 | 1/2018 | Boesen |
| 2018/0014140 A1 | 1/2018 | Milevski et al. |
| 2018/0014436 A1 | 1/2018 | Milevski |
| 2018/0034951 A1 | 2/2018 | Boesen |
| 2018/0040093 A1 | 2/2018 | Boesen |
| 2018/0042501 A1 | 2/2018 | Adi et al. |

FOREIGN PATENT DOCUMENTS

| | | |
|---|---|---|
| CN | 104837094 A | 8/2015 |
| EP | 1469659 A1 | 10/2004 |
| EP | 1017252 A3 | 5/2006 |
| EP | 2903186 A1 | 8/2015 |
| GB | 2074817 | 4/1981 |
| GB | 2508226 A | 5/2014 |
| JP | 06292195 | 10/1994 |
| WO | 2008103925 A1 | 8/2008 |
| WO | 2008113053 A1 | 9/2008 |
| WO | 2007034371 A3 | 11/2008 |
| WO | 2011001433 A2 | 1/2011 |
| WO | 2012071127 A1 | 5/2012 |
| WO | 2013134956 A1 | 9/2013 |
| WO | 2014046602 A1 | 3/2014 |
| WO | 2014043179 A3 | 7/2014 |
| WO | 2015061633 A2 | 4/2015 |
| WO | 2015110577 A1 | 7/2015 |
| WO | 2015110587 A1 | 7/2015 |
| WO | 2016032990 A1 | 3/2016 |
| WO | 2016187869 A1 | 12/2016 |

OTHER PUBLICATIONS

Alzahrani et al: "A Multi-Channel Opto-Electronic Sensor to Accurately Monitor Heart Rate against Motion Artefact during Exercise", Sensors, vol. 15, No. 10, Oct. 12, 2015, pp. 25681-25702, XPO55334602, DOI: 10.3390/s151025681 the whole document.

Announcing the $3,333,333 Stretch Goal (Feb. 24, 2014).

Ben Coxworth: "Graphene-based ink could enable low-cost, foldable electronics", "Journal of Physical Chemistry Letters", Northwestern University, (May 22, 2013).

Blain: "World's first graphene speaker already superior to Sennheiser MX400", htt://www.gizmag.com/graphene-speaker-beats-sennheiser-mx400/31660, (Apr. 15, 2014).

BMW, "BMW introduces BMW Connected—The personalized digital assistant", "http://bmwblog.com/2016/01/05/bmw-introduces-bmw-connected-the-personalized-digital-assistant", (Jan. 5, 2016).

BRAGI is on Facebook (2014).

BRAGI Update—Arrival of Prototype Chassis Parts—More People—Awesomeness (May 13, 2014).

BRAGI Update—Chinese New Year, Design Verification, Charging Case, More People, Timeline(Mar. 6, 2015).

BRAGI Update—First Sleeves From Prototype Tool—Software Development Kit (Jun. 5, 2014).

BRAGI Update—Lets Get Ready to Rumble, A Lot to Be Done Over Christmas (Dec. 22, 2014).

(56) References Cited

OTHER PUBLICATIONS

BRAGI Update—Memories From April—Update on Progress (Sep. 16, 2014).
BRAGI Update—Memories from May—Update on Progress—Sweet (Oct. 13, 2014).
BRAGI Update—Memories From One Month Before Kickstarter—Update on Progress (Jul. 10, 2014).
BRAGI Update—Memories From the First Month of Kickstarter—Update on Progress (Aug. 1, 2014).
BRAGI Update—Memories From the Second Month of Kickstarter—Update on Progress (Aug. 22, 2014).
BRAGI Update—New People @BRAGI—Prototypes (Jun. 26, 2014).
BRAGI Update—Office Tour, Tour to China, Tour to CES (Dec. 11, 2014).
BRAGI Update—Status on Wireless, Bits and Pieces, Testing—Oh Yeah, Timeline(Apr. 24, 2015).
BRAGI Update—The App Preview, The Charger, The SDK, BRAGI Funding and Chinese New Year (Feb. 11, 2015).
BRAGI Update—What We Did Over Christmas, Las Vegas & CES (Jan. 19, 2014).
BRAGI Update—Years of Development, Moments of Utter Joy and Finishing What We Started(Jun. 5, 2015).
BRAGI Update—Alpha 5 and Back to China, Backer Day, On Track(May 16, 2015).
BRAGI Update—Beta2 Production and Factory Line(Aug. 20, 2015).
BRAGI Update—Certifications, Production, Ramping Up.
BRAGI Update—Developer Units Shipping and Status(Oct. 5, 2015).
BRAGI Update—Developer Units Started Shipping and Status (Oct. 19, 2015).
BRAGI Update—Developer Units, Investment, Story and Status(Nov. 2, 2015).
BRAGI Update—Getting Close(Aug. 6, 2015).
BRAGI Update—On Track, Design Verification, How It Works and What's Next(Jul. 15, 2015).
BRAGI Update—On Track, On Track and Gems Overview.
BRAGI Update—Status on Wireless, Supply, Timeline and Open House@BRAGI(Apr. 1, 2015).
BRAGI Update—Unpacking Video, Reviews on Audio Perform and Boy Are We Getting Close(Sep. 10, 2015).
Healthcare Risk Management Review, "Nuance updates computer-assisted physician documentation solution" (Oct. 20, 2016).
Hoffman, "How to Use Android Beam to Wirelessly Transfer Content Between Devices", (Feb. 22, 2013).
Hoyt et. al., "Lessons Learned from Implementation of Voice Recognition for Documentation in the Military Electronic Health Record System", The American Health Information Management Association (2017).
Hyundai Motor America, "Hyundai Motor Company Introduces a Health + Mobility Concept for Wellness in Mobility", Fountain Valley, California (2017).
International Search Report & Written Opinion, PCT/EP16/70245 (dated Nov. 16, 2016).
International Search Report & Written Opinion, PCT/EP2016/070231 (dated Nov. 18, 2016).
International Search Report & Written Opinion, PCT/EP2016/070247 (dated Nov. 18, 2016).
International Search Report & Written Opinion, PCT/EP2016/07216 (dated Oct. 18, 2016).
International Search Report and Written Opinion, PCT/EP2016/070228 (dated Jan. 9, 2017).
Jain A et al: "Score normalization in multimodal biometric systems", Pattern Recognition, Elsevier, GB, vol. 38, No. 12, Dec. 31, 2005, pp. 2270-2285, XP027610849, ISSN: 0031-3203.
Last Push Before the Kickstarter Campaign Ends on Monday 4pm CET (Mar. 28, 2014).
Nemanja Paunovic et al, "A methodology for testing complex professional electronic systems", Serbian Journal of Electrical Engineering, vol. 9, No. 1, Feb. 1, 2012, pp. 71-80, XP055317584, YU.
Nigel Whitfield: "Fake tape detectors, 'from the stands' footie and UGH? Internet of Things in my set-top box"; http://www.theregister.co.uk/2014/09/24/ibc_round_up_object_audio_dlna_iot/ (Sep. 24, 2014).
Nuance, "ING Netherlands Launches Voice Biometrics Payment System in the Mobile Banking App Powered by Nuance", "https://www.nuance.com/about-us/newsroom/press-releases/ing-netherlands-launches-nuance-voice-biometirics.html", 4 pages (Jul. 28, 2015).
Staab, Wayne J., et al., "A One-Size Disposable Hearing Aid is Introduced", The Hearing Journal 53(4):36-41) Apr. 2000.
Stretchgoal—Its Your Dash (Feb. 14, 2014).
Stretchgoal—The Carrying Case for the Dash (Feb. 12, 2014).
Stretchgoal—Windows Phone Support (Feb. 17, 2014).
The Dash + The Charging Case & The BRAGI News (Feb. 21, 2014).
The Dash—A Word From Our Software, Mechanical and Acoustics Team + An Update (Mar. 11, 2014).
Update From BRAGI—$3,000,000—Yipee (Mar. 22, 2014).
Weisiger; "Conjugated Hyperbilirubinemia", Jan. 5, 2016.
Wertzner et al., "Analysis of fundamental frequency, jitter, shimmer and vocal intensity in children with phonological disorders", V. 71, n5, 582-588, Sep./Oct. 2005; Brazilian Journal of Othrhinolaryngology.
Wikipedia, "Gamebook", https://en.wikipedia.org/wiki/Gamebook, Sep. 3, 2017, 5 pages.
Wikipedia, "Kinect", "https://en.wikipedia.org/wiki/Kinect", 18 pages, (Sep. 9, 2017).
Wikipedia, "Wii Balance Board", "https://en.wikipedia.org/wiki/Wii_Balance_Board", 3 pages, (Jul. 20, 2017).

\* cited by examiner

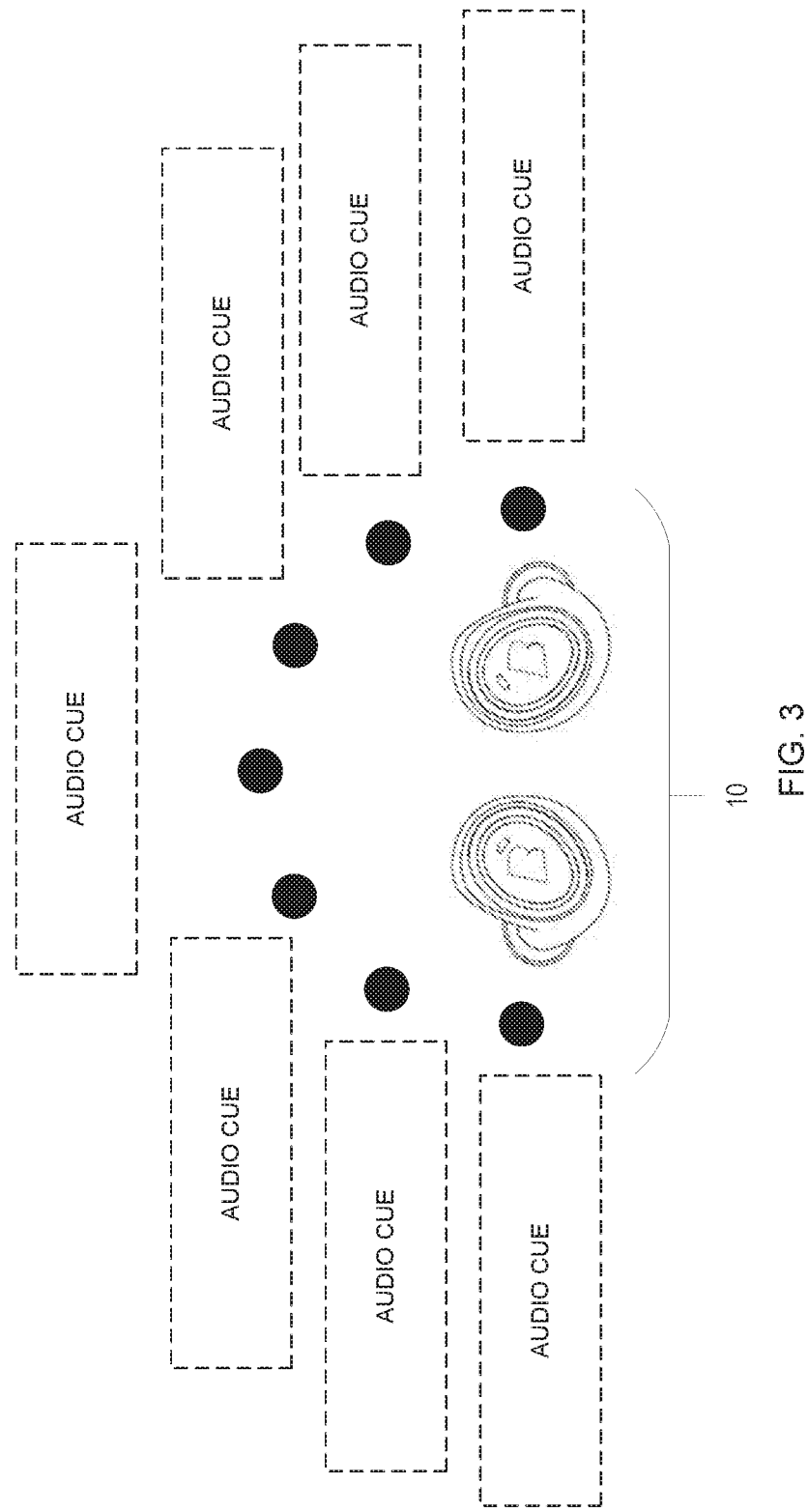

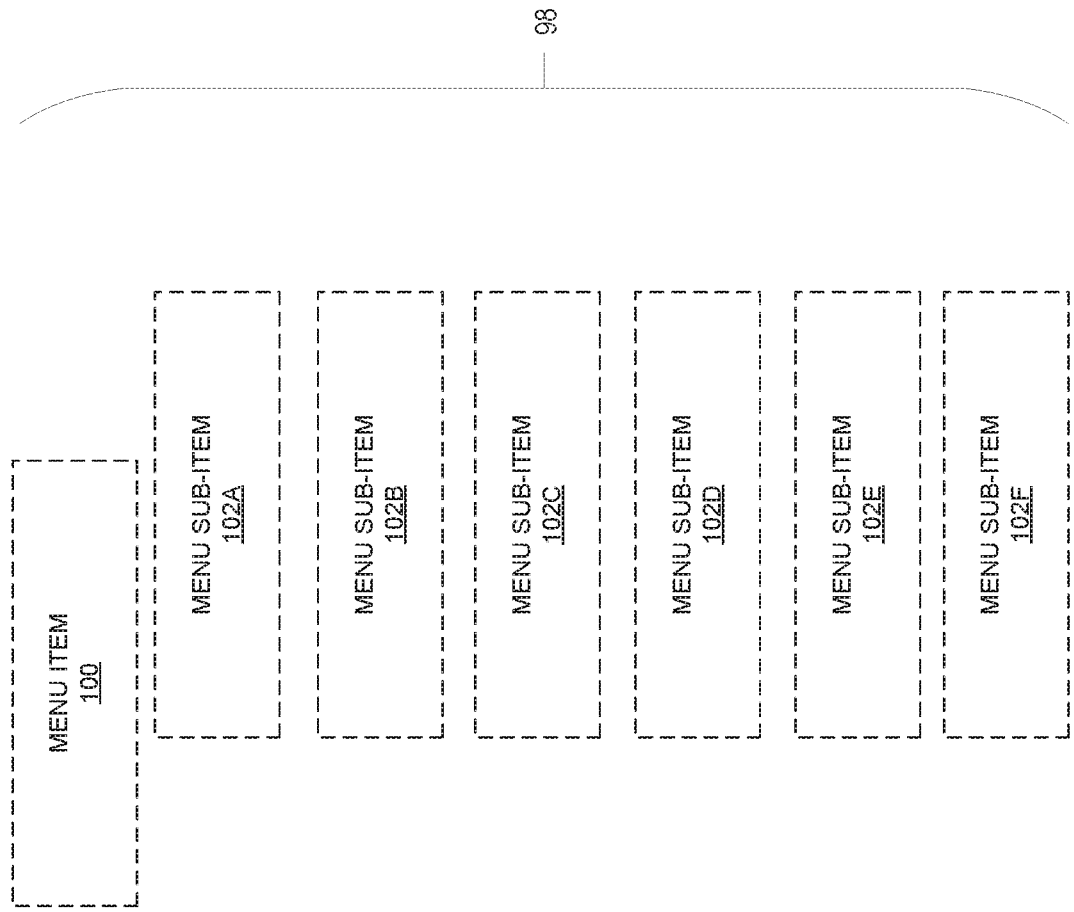

EARPIECE WITH AUDIO 3D MENU

PRIORITY STATEMENT

This application claims priority to U.S. Provisional Patent Application No. 62/464,337, filed Feb. 27, 2017, hereby incorporated by reference in its entirety.

FIELD OF THE INVENTION

The present invention relates to wearable devices. More particularly, but not exclusively, the present invention relates to earpieces.

BACKGROUND

Wearable technology is a fast-developing field, and thus significant developments are needed in how users interact and interface with these technologies. Various alternatives exist for determining user intent in wearable technology exist. One such alternative is to use touch-based interfaces. Examples of touch-based interfaces may include capacitive touch screen, buttons, switches, pressure sensors, and finger print sensor. Another alternative is to use audio interfaces such as through use of key-word vocal commands or natural language spoken commands. Another alternative is to use a gesture based interface such that hand motions may be measured by some sensor and then classified as certain gestures. Yet another alternative is to use a computer-vision based interface such as by e.g. recognition of a specific individual, of a user's presence in general, or of two or more people.

Wearable technology presents particular challenges in that user-interfaces successful for established technologies are in some cases no longer the most natural, convenient, appropriate or simple interface for users. For example, large capacitive touchscreens are widely used in mobile devices but the inclusion of such a user interface may not be appropriate for discrete ear-worn devices.

Therefore, what is needed are improved user interfaces for wearable devices.

SUMMARY

Therefore, it is a primary object, feature, or advantage of the present invention to improve over the state of the art.

It is a further object, feature, or advantage of the present invention to provide for triggering an event after determining a user's attention or intention.

Another object, feature, or advantage is to provide an improved user interface for a wearable such as an earpiece wearable.

It is a still further object, feature, or advantage of the present invention to provide for an interface which uses audio menus.

Another object, feature, or advantage of the present invention is to use sensor data such as inertial sensor data, biometric sensor data, and environmental sensor data to determine a user's attention or intention.

Yet another object, feature, or advantage of the present invention is to interact with a user without requiring manual input on a device and without requiring voice input to the device.

One or more of these and/or other objects, features, or advantages of the present invention will become apparent from the specification and claims that follow. No single embodiment need provide each and every object, feature, or advantage. Different embodiments may have different objects, features, or advantages. Therefore, the present invention is not to be limited to or by an objects, features, or advantages stated herein.

According to one aspect an earpiece includes an earpiece housing, an intelligent control system disposed within the earpiece housing, a speaker operatively connected to the intelligent control system, a microphone operatively connected to the intelligent control system, and at least one sensor operatively connected to the intelligent control system for providing sensor data. The intelligent control system of the earpiece is configured to interface with a user of the earpiece by determining at least one of attention or intention of the user using the sensor data without receiving manual input at the earpiece and without receiving voice input from the user. The earpiece may be further configured to present an audio menu and use the attention or intention of the user to select one or more items from the audio menu. The at least one sensor may include an inertial sensor and the step of determining the attention or intention of the user may be based at least in part on head orientation and/or head movement. The at least one sensor may further include at least one biometric sensor and the step of determining the attention or intention of the user may be based at least in part on biometric data from the at least one biometric sensor. The at least one sensor may further include at least one environmental sensor and the step of determining the attention or intention of the user may be based at least in part on environmental data from the at least one environmental sensor.

According to another aspect, an earpiece includes an earpiece housing, an intelligent control system disposed within the earpiece housing, a speaker operatively connected to the intelligent control system, a microphone operatively connected to the intelligent control system, and at least one inertial sensor operatively connected to the intelligent control system for providing inertial sensor data. The intelligent control system of the earpiece may be configured to interface with a user of the earpiece by providing audio cues associated with a menu containing a plurality of selections and receiving a selection of one of the plurality of the selections within the menu at least partially based on the inertial sensor data. The menu may have a plurality of levels. Each of the selections within a given level of the menu may be associated with different head positions although a user may otherwise communicate their attention or intention. The earpiece may be further configured to interface with the user of the earpiece by receiving a confirmation of the selection of one of the plurality of the selections within the menu based on the inertial sensor data or other sensor data.

According to yet another aspect, a system includes a first earpiece and a second earpiece wherein each of the first earpiece comprises an earpiece housing, a speaker, a microphone, and a transceiver. At least one of the first earpiece and the second earpiece further includes at least one sensor for providing sensor data. At least one of the first earpiece and the second earpiece may further include an intelligent control system to interface with a user of the earpiece by determining at least one of attention or intention of the user using the sensor data without receiving manual input at the earpiece and without receiving voice input from the user. The system may be configured to present an audio menu and use the attention or intention of the user to select one or more items from the audio menu. The audio menu may include a plurality of audio cues and wherein the audio cues are processed with a psychoacoustic model to virtually place or move sounds in 3D space relative to the user. The at least one sensor may include an inertial sensor and the step of determining the attention or intention of the user may be based at least in part on head orientation and/or head movement. The at least one sensor may further include one or more biometric sensors and/or one or more environmental sensors.

BRIEF DESCRIPTION OF THE DRAWINGS

FIG. 3 illustrates one example of making a selection from a menu of audio cues.

FIG. 4 illustrates an example of an audio menu.

DETAILED DESCRIPTION

The present invention provides for methods, apparatus, and systems to allow for triggering of an event through determining the attention and/or intention of a user. In other words, instead of conventional user interfaces triggering of events may be performed by determining the attention and/or intention of a user. Although, specific embodiments are shown and described with respect to earpieces or ear worn computers and sensor packages, it is to be understood that methodologies shown and described may be applied to other type of wearable devices.

Figure 1:
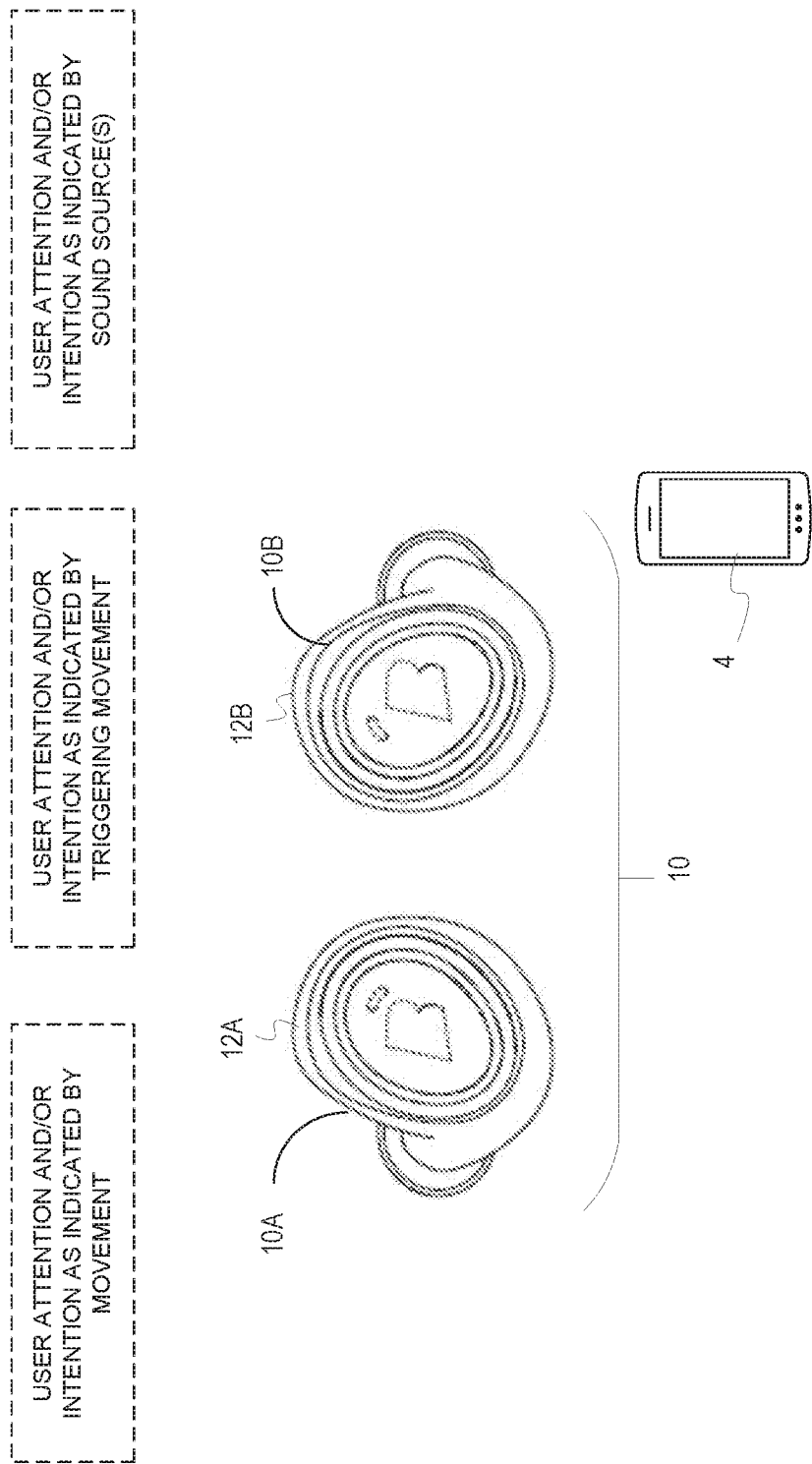
FIG. 1 illustrates one example of a set of earpieces with an interface to determine user intention and/or intention as indicated by movement, determine user attention and/or intention as indicated by a triggering movement, and/or determine user attention and/or intention as indicated by sound source(s).

FIG. 1 illustrates one such example of a set of earpieces 10 which includes a first earpiece 10A and a second earpiece 10B which may be in the form of a left earpiece and a right earpiece. The first earpiece 10A has an earpiece housing 12A and the second earpiece 10B has a second earpiece housing 10B. One or more of the earpieces 10A, 10B may be in wireless communication with another device such as a mobile device 4. The earpieces 10 provide a user interface which allows a user to interact through attention and/or intention. Here, the term "attention" is used to describe the act of a user consciously or subconsciously focusing on a specific entity. Here, the term "intention" is used to describe the act of a user consciously or subconsciously wanting to trigger an event. The earpieces 10 (or one or more individual earpieces 10A, 10B) may include a user interface which uses one or more sensors to detect user attention and/or intention as indicated by movement, user attention and/or intention as indicated by triggering movements, and/or user attention and/or intention as indicated by sound sources. It is to be understood that other inputs may also be present.

Focusing on a specific entity may be performed in various ways. For example, focusing may be performed through particular motions. Thus, for example, a user may turn to face something, gesture toward something, or move toward something in order to place a positive focus on an entity. Alternatively, a user may turn away from something, move away from something, gesture to reject something, gesture to shield oneself from something, invoke an involuntary (e.g. fight/flight response) reaction to something, which are all examples of placing a negative focus on an entity. Focus may also be determined based on subconscious emotional responses. For examples, changes in facial expression may be used as input. Thus, for example a smile may be used as one form of attention while a scowl may be used as another form of attention. Focus may also be determined based on subconscious physiological information. This may include, for example, changes in heart rate, changes in heart rate variability, changes in perspiration levels, changes in skin conductance, and changes in evoked potentials in brain waves. Focus may also be determined by listening to a particular sound source. For example, a user may consciously listen to a particular source of sound in an environment where there is more than one sound source present. Alternatively, a user may subconsciously listen to a particular source of sound in an environment where there is more than one sound source present.

The interface may use one or more different sensors to determine metrics of the user's state from which the user's attention and/or intention may be derived. Any number of different sensors may be used including microphones, image sensors, time of flight sensors, inertial sensors, physiological sensors, or other types of sensors.

Figure 2:
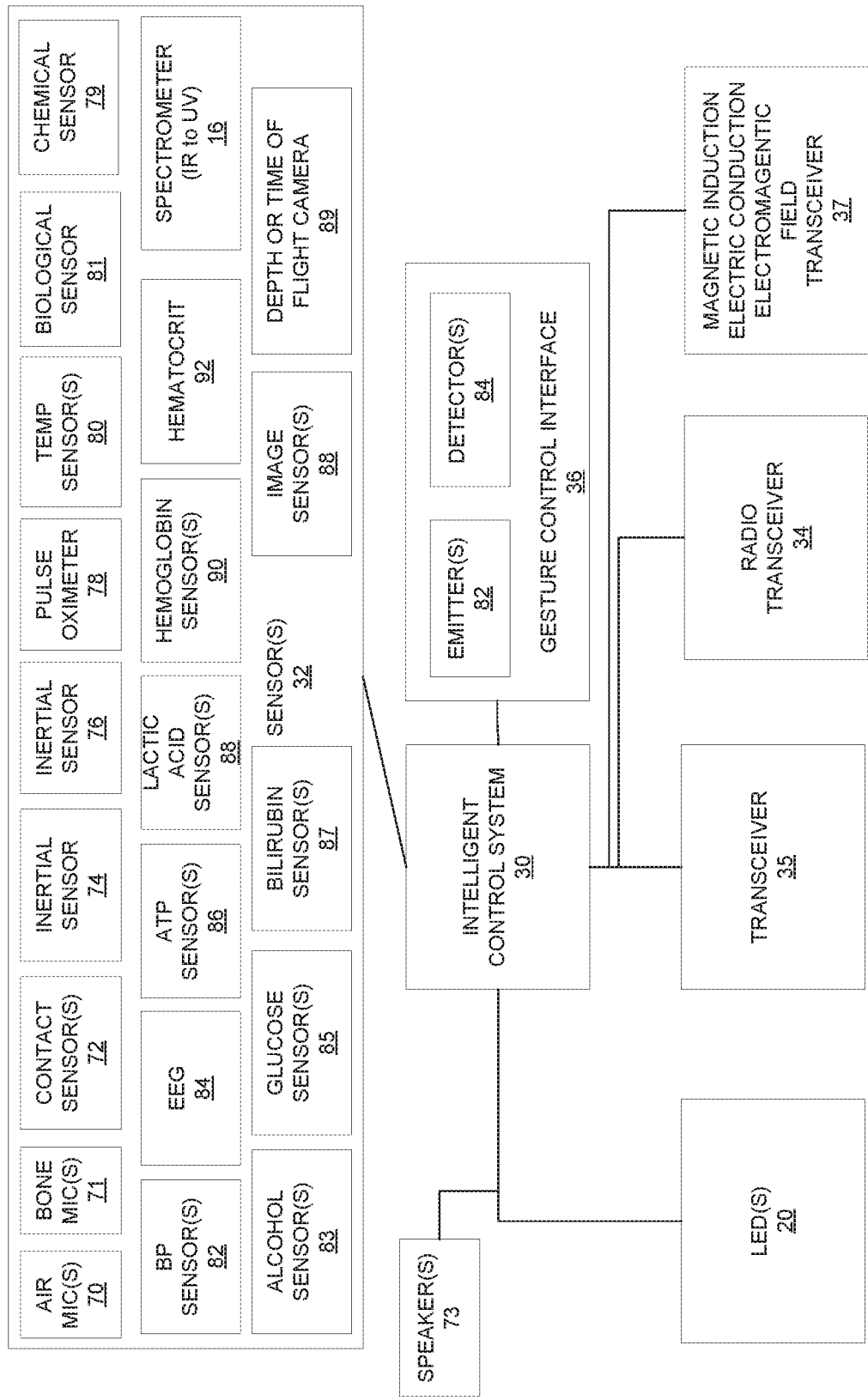
FIG. 2 is a block diagram of one example of an earpiece.

FIG. 2 is a block diagram illustrating a device which may be housed within the earpiece housing. The device may include one or more LEDs 20 electrically connected to an intelligent control system 30. The intelligent control system 30 may include one or more processors, digital signal processors, microcontrollers, application specific integrated circuits, or other types of integrated circuits. The intelligent control system 30 may also be electrically connected to one or more sensors 32. Where the device is an earpiece, the sensor(s) may include an inertial sensor 74, another inertial sensor 76. Each inertial sensor 74, 76 may include an accelerometer, a gyro sensor or gyrometer, a magnetometer or other type of inertial sensor. The sensor(s) 32 may also include one or more contact sensors 72, one or more bone conduction microphones 71, one or more air conduction microphones 70, one or more chemical sensors 79, a pulse oximeter 76, a temperature sensor 80, or other physiological or biological sensor(s). Further examples of physiological or biological sensors include an alcohol sensor 83, glucose sensor 85, or bilirubin sensor 87. Other examples of physiological or biological sensors may also be included in the device. These may include a blood pressure sensor 82, an electroencephalogram (EEG) 84, an Adenosine Triphosphate (ATP) sensor, a lactic acid sensor 88, a hemoglobin sensor 90, a hematocrit sensor 92 or other biological or chemical sensor. Other types of sensors may be present A spectrometer 16 is also shown. The spectrometer 16 may be an infrared (IR) through ultraviolet (UV) spectrometer although it is contemplated that any number of wavelengths in the infrared, visible, or ultraviolet spectrums may be detected. The spectrometer 16 is preferably adapted to measure environmental wavelengths for analysis and recommendations and thus preferably is located on or at the external facing side of the device. An image sensor 88 may be present and a depth or time of flight camera 89 may also be present. A gesture control interface 36 may also be operatively connected to or integrated into the intelligent control system 30. The gesture control interface 36 may include one or more emitters 82 and one or more detectors 84 for sensing user gestures. The gestures performed may be performed such as through contact with a surface of the earpiece or may be performed near the earpiece. The emitters may be of any number of types including infrared LEDs. The device may include a transceiver 35 which may allow for induction transmissions such as through near field magnetic induction. A short range transceiver 34 using Bluetooth, BLE, UWB, or other means of radio communication may also be present. The short range transceiver 34 may be used to communicate with other devices including mobile devices. The various sensors 32, the intelligent control system 30, and other electronic components may be located on one or more printed circuit boards of the device. One or more speakers 73 may also be operatively connected to the intelligent control system 30. A magnetic induction electric conduction electromagnetic (E/M) field transceiver 37 or other type of electromagnetic field receiver may also operatively connected to the intelligent control system 30 to link it to the electromagnetic field of the user. The use of the E/M transceiver 37 allows the device to link electromagnetically into a personal area network or body area network or other device. It is contemplated that sensors associated with other devices including other wearable devices or interne of things (IoT) devices may be used to provide or add to sensor data which may be used in determining user attention or intention in any number of different ways and in any number of different contexts or situations.

It is contemplated that the interface may have different modes of operations which may include a sleep mode to conserve battery life and/or reduce power usage. The interface may be awakened in any number of ways such as through a deliberate interaction between the user and the interface or through a behavior recognized by the interfaces. For example, movement of the head may serve to awaken the interface.

When the interface is awake and/or active, the user may be presented with different audio prompts or feedback based on the orientation of their head, thereby allowing them to trigger an event in the interface. Thus, all possible orientations of the head (or any subset thereof) may be used as input channels to the interface. In this example, audio prompts or audio feedback may be presented to the user and the intention of the user may be determined by the interface via a confirmation gesture or otherwise. For example, in one alternative a user may simply continue to attend a presented audio cue.

In one alternative, sounds may be played to user according to their (the user's) orientation. FIG. 3 illustrates such an example. The sounds may be in the form of language or may be other types of audio icons or audio cues where particular sounds or combinations of sounds associated with a selection may have different meanings, preferably intuitive meanings to better convey different selections including different selections within a menu of selections. The audio cues may convey position information as well as a description for the selection. Thus, for example, one selection may be associated with a user facing directly ahead (or a 12 o'clock position), another selection may be associated with a slight turn to the right or clockwise (1 o'clock), another selection may be associated with a larger turn to the right or clockwise (2 o'clock), another selection may be associated with being turned even further to the right or clockwise (3 o'clock). Similarly, additional selections may be associated with a slight turn to the left or counter-clockwise (11 o'clock), a greater turn to the left or counter-clockwise (10 o'clock), or an even greater turn to the left (9 o'clock). Thus, an audio prompt may include "9" or "9 o'clock" and be accompanies by words or sounds associated with a particular selection. Other selections may be provided in the same way. Thus, in this simple arrangement, up to seven different selections may be given to a user. Although it is contemplated that more or fewer selections may be present and they may be more than one level of selections present. For example, a menu may be present with multiple levels and by selecting one selection within a level of the menu, the user may be presented with additional selections. FIG. 4 illustrates that a single menu item or selection 100 of an audio menu 98 may have a plurality of additional plurality of items 102A, 102B, 102C, 102D, 102E, 102F associated with it. There may be any numbers of different levels of items present in an audio menu. An audio menu is an audio presentation of a plurality of items from which a user may select.

It also to be understood that the menus provided may be built dynamically to present the items in an order generated to present the most likely selections first. A determination of the most likely selections may be performed in various ways including based on user history, user preferences, and/or through using other contextual information including sensor data.

According, to another example with a more natural attention-detection mechanism, the user may be presented various audio cues or selections at particular locations. Audio feedback or cues may be processed with a psychoacoustic model to virtually place or move sounds in 3D space relative to the user. Thus, for example, different audio cues or selections may be placed in different locations, such as up, down, right, left, up and to the right, down and to the right, down and to the left. Of course, any number of other locations may be used. It should be understood that in this example, the audio cues need not include position information. Instead, the position is associated with the perceived location or direction of the sound source. In addition to placing audio cues or audio feedback or selections at different locations, these sounds may also be moved in 3D space relative to a user. Thus, for example, a sound may be introduced at one location and may be perceived as moving from that location to another location. This is another tool by which a user may convey their interest in a particular selection, as their head movement may track movement of a sound. In addition, after a user has selected a sound, one manner in which confirmation of the selection may be made is to move the sound to another location and confirm that the user is focused on that sound and thus intends to make that selection. This may be accomplished by having the user select the same sound again (but in a different location) or to confirm that the user has begun to track the sound after selection. If the user does not intend to make a particular selection, then the user would not select the same sound again or would not track that sound, such as either by exhibiting no head movement or by movement in a different direction. These are examples of inferring intention if the user continues to maintain attention on a presented audio cue.

In addition to or instead of inertial sensors, other types of sensors may also be used including biometric sensors. Biometric sensors may be used to ascertain subconscious and/or unintentional information about the state of the user. Biometric data may be used to complement logic behind determining the user's intent to a greater extent and provide a greater depth of contextual information to the interface, such that the information presented is more relevant to the user. Examples of biometric data may include pulse oximetry data, heart rate, heart variability, perspiration level, skin conductance, evoked potentials in brain waves, and other types of biometric data.

In addition to inertial sensors and biometric sensors other types of sensors may also be used to sense environmental conditions or information. Such environmental data may be used to enable the information presented to be more relevant and may include, without limitation, data such as geographic location such as may be determined using a GPS sensor, location in a localized sensed such as indoors or outdoors. Other types of sensors may include depth or time of flight cameras, air pressure sensors, barometric sensors, volatile organic compound sensors, small-particle sensors, temperature sensors, photometers, image sensors or cameras, or other types of sensors.

It is to be further understood that context may be based in part on the relative location to other objects. Other objects may be identified in any number of ways. For example, where the sensors include imaging sensors, imagery may be acquired and image processing algorithms may be performed to detect and classify objects upon which a user's attention may be focused such as may be determined based on the direction their head is pointed. Similarly, audio sources may be identified and classified based on data sensed with external microphones and the user's attention on a particular audio source may be determined in part based on the orientation of the user's head or other information such as if the user has made adjustment to audio settings to focus on that individual. Wireless transceivers of various types associated with the earpiece may also be used to identify objects where the object is in wireless communication with the user.

Although various examples have been shown and described throughout, it is to be understood that numerous variations, options, and alternatives and contemplated. This includes variations in the sensors used, the placement of sensors, the manner in which audio menus are constructed, and other variations, options, and alternatives.

What is claimed is:

1. An earpiece comprising:
an earpiece housing;
an intelligent control system disposed within the earpiece housing;
a speaker operatively connected to the intelligent control system;
a microphone operatively connected to the intelligent control system;
at least one sensor operatively connected to the intelligent control system for providing sensor data, wherein the at least one sensor includes an inertial sensor and wherein the sensor data includes inertial sensor data;
wherein the intelligent control system is configured to determine, using the inertial sensor data, if the user movement detected with the at least one sensor is indicative that the user intends to awaken an audio menu interface comprising an audio menu, the audio menu interface providing a hierarchy of menu selections having a plurality of levels with a plurality of menu selections present at each of the plurality of levels;
wherein the intelligent control system of the earpiece is configured to interface with a user of the earpiece by determining at least one of attention or intention of the user using the sensor data without receiving manual input at the earpiece and without receiving voice input from the user;
wherein the earpiece is configured to present the audio menu when the audio menu interface is awakened and use the attention or intention of the user to select a first item from the audio menu by sensing a first head movement of the user and confirm selection of the first item by sensing a second head movement of the user;
wherein the earpiece is further configured to present a second plurality of menu selections in response to a confirmation of the selection of the first item;
wherein each of the plurality of menu selections is positioned in a different location in 3D space relative to the user using a psychoacoustic model.

2. The earpiece of claim 1 wherein the determining the attention or intention of the user is based at least in part on head orientation and/or head movement.

3. The earpiece of claim 2 wherein the at least one sensor further includes at least one biometric sensor and wherein the determining the attention or intention of the user is based at least in part on biometric data from the at least one biometric sensor.

4. The earpiece of claim 3 wherein the at least one sensor further includes at least one environmental sensor and wherein the determining the attention or intention of the user is based at least in part on environmental data from the at least one environmental sensor.

5. The earpiece of claim 1 further comprising at least one wireless transceiver disposed within the earpiece housing and operatively connected to the intelligent control system.

6. The earpiece of claim 1 wherein the audio menu comprises a plurality of item selections and wherein the item selections are arranged in part based on the sensor data.

7. The earpiece of claim 1 wherein the audio menu comprises a plurality of levels.

8. An earpiece comprising:
an earpiece housing;
an intelligent control system disposed within the earpiece housing;
a speaker operatively connected to the intelligent control system;
a microphone operatively connected to the intelligent control system;
at least one inertial sensor operatively connected to the intelligent control system for providing inertial sensor data;
wherein the intelligent control system is configured to determine, using the inertial sensor data, if the user movement detected with the at least one sensor is indicative that the user intends to awaken an audio menu interface comprising an audio menu;
wherein the intelligent control system of the earpiece is configured to interface with a user of the earpiece by:
providing audio cues associated with the audio menu containing a plurality of selections;
receiving a selection of one of the plurality of the selections within the audio menu at least partially based on the inertial sensor data without receiving manual input at the earpiece and without receiving voice input from the user;
receiving a confirmation of the selection of one of the plurality of the selections from the user, wherein the confirmation is based on head movement of the user;
providing audio cues associated with a plurality of sub menu items in response to the confirmation of the selection of one of the plurality of selections.

9. The earpiece of claim 8 wherein the menu comprises a plurality of levels.

10. The earpiece of claim 9 wherein each of the selections within a first level of the menu is associated with a different head position.

11. The earpiece of claim 10 wherein each of the selections within a second level of the menu is associated with a different head position.

12. The earpiece of claim 8 wherein the intelligent control of the earpiece is further configured to interface with the user of the earpiece by receiving a confirmation of the selection of one of the plurality of the selections within the menu based on the inertial sensor data.

13. A system comprising:

a first earpiece and a second earpiece wherein each of the first earpiece and the second earpiece comprises an earpiece housing sized and shaped for fitting into an ear of the user, a speaker, a microphone, and a transceiver;

wherein the first earpiece further comprises at least an accelerometer, a gyrometer, and a magnetometer for providing first sensor data;

wherein the second earpiece further comprises at least an accelerometer, a gyrometer, and a magnetometer for providing second sensor data;

wherein at least one of the first earpiece and the second earpiece further comprises an intelligent control system to interface with a user of the earpiece by determining at least one of attention or intention of the user using the first sensor data and the second sensor data without receiving manual input at the earpiece and without receiving voice input from the user;

wherein the system is configured to present an audio menu and use the attention or intention of the user to select at least one item from the audio menu, the system providing a hierarchy of menu selections having a plurality of levels with a plurality of the menu selections present at each of the plurality of levels;

wherein the system is configured to confirm the selection of the at least one item from the audio selections, wherein the confirmation is based at least in part on head movement of the user;

wherein the system is further configured to present a second plurality of menu selections in response to the confirmation of the at least one item from the audio menu.

14. The system of claim 13 wherein the audio menu comprises a plurality of audio cues and wherein the audio cues are processed with a psychoacoustic model to virtually place or move sounds in 3D space relative to the user.

15. The system of claim 13 wherein the determining the attention or intention of the user is based at least in part on head orientation and/or head movement.

16. The system of claim 15 wherein the first earpiece further comprises at least one biometric sensor and wherein the determining the attention or intention of the user is based at least in part on biometric data from the at least one biometric sensor of the first earpiece.

17. The system of claim 16 wherein the first earpiece further includes at least one environmental sensor and wherein the determining the attention or intention of the user is based at least in part on environmental data from the at least one environmental sensor.

18. The system of claim 13 wherein the audio menu is configured to include seven different items.

* * * * *